(12) United States Patent
Neuman (10) Patent No.: US 10,746,910 B2
(45) Date of Patent: Aug. 18, 2020

(54) TRANSFLECTIVE COATINGS FOR TRANSPARENCIES

(71) Applicant: Gentex Corporation, Zeeland, MI (US)

(72) Inventor: George A. Neuman, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 170 days.

(21) Appl. No.: 15/903,403

(22) Filed: Feb. 23, 2018

(65) Prior Publication Data
US 2018/0246265 A1 Aug. 30, 2018

Related U.S. Application Data

(60) Provisional application No. 62/463,900, filed on Feb. 27, 2017.

(51) Int. Cl.
| | |
|---|---|
| F21V 9/04 | (2018.01) |
| F21V 9/06 | (2018.01) |
| G02B 5/08 | (2006.01) |
| G02B 5/20 | (2006.01) |
| G02B 5/28 | (2006.01) |
| G02F 1/157 | (2006.01) |
| G02F 1/1335 | (2006.01) |

(52) U.S. Cl.
CPC ....... *G02B 5/282* (2013.01); *G02F 1/133509* (2013.01); *G02F 1/157* (2013.01); *G02B 5/208* (2013.01)

(58) Field of Classification Search
CPC ...... G02B 5/208; C12P 13/001; C12P 17/366; C12P 17/12
USPC ......................................................... 359/360
See application file for complete search history.

(56) References Cited

U.S. PATENT DOCUMENTS

| | | | |
|---|---|---|---|
| 7,391,563 B2 | 6/2008 | McCabe et al. | |
| 7,855,755 B2 | 12/2010 | Weller et al. | |
| 2006/0050356 A1* | 3/2006 | Varaprasad | B60R 1/12 359/265 |
| 2009/0080055 A1* | 3/2009 | Baur | B32B 17/10174 359/267 |
| 2012/0075168 A1* | 3/2012 | Osterhout | G02B 27/017 345/8 |
| 2012/0194419 A1* | 8/2012 | Osterhout | G02B 27/0093 345/156 |

(Continued)

*Primary Examiner* — William R Alexander
*Assistant Examiner* — Tamara Y. Washington
(74) *Attorney, Agent, or Firm* — Price Heneveld LLP; Bradley D. Johnson (57) ABSTRACT

An electro-optic element includes a first substantially transparent substrate defining a first surface and a second surface. A second substantially transparent substrate defines a third surface and a fourth surface. A primary seal is disposed between the first and second substrates. The seal and the first and second substrates define a cavity. An electro-optic material is positioned within the cavity. A transflective coating having a transmittance of between about 15% and about 60% in a visible wavelength band is positioned on at least one of the second and third surfaces. The transflective coating includes a first layer including an absorbing material, a second layer, a third layer including a low index metal and a fourth layer. The second and fourth layers include at least one of a dielectric material and a transparent conducting oxide.

20 Claims, 4 Drawing Sheets

(56) References Cited

U.S. PATENT DOCUMENTS

| | | | |
|---|---|---|---|
| 2012/0194420 A1* | 8/2012 | Osterhout | G02B 27/0093 345/156 |
| 2012/0194549 A1* | 8/2012 | Osterhout | G02B 27/0093 345/633 |
| 2012/0194550 A1* | 8/2012 | Osterhout | G02B 27/0093 345/633 |
| 2012/0194551 A1* | 8/2012 | Osterhout | G02B 27/0093 345/633 |
| 2012/0194552 A1* | 8/2012 | Osterhout | G02B 27/0093 345/633 |
| 2012/0194553 A1* | 8/2012 | Osterhout | G02B 27/0093 345/633 |
| 2012/0200488 A1* | 8/2012 | Osterhout | G02B 27/0093 345/156 |
| 2012/0200499 A1* | 8/2012 | Osterhout | G02B 27/0093 345/158 |
| 2012/0200601 A1* | 8/2012 | Osterhout | G02B 27/0093 345/633 |
| 2012/0206322 A1* | 8/2012 | Osterhout | G02B 27/0093 345/8 |
| 2012/0206323 A1* | 8/2012 | Osterhout | G02B 27/0093 345/8 |
| 2012/0206334 A1* | 8/2012 | Osterhout | G06F 1/163 345/156 |
| 2012/0206335 A1* | 8/2012 | Osterhout | G02B 27/0093 345/156 |
| 2012/0206485 A1* | 8/2012 | Osterhout | G02B 27/0093 345/633 |
| 2012/0212406 A1* | 8/2012 | Osterhout | G02B 27/017 345/156 |
| 2012/0212414 A1* | 8/2012 | Osterhout | G02B 27/017 345/158 |
| 2012/0240631 A1 | 9/2012 | Matsumoto | |
| 2013/0127980 A1* | 5/2013 | Haddick | G06F 3/013 348/14.08 |
| 2013/0278631 A1* | 10/2013 | Border | G06F 3/04842 345/633 |
| 2013/0314303 A1* | 11/2013 | Osterhout | G06F 3/005 345/8 |
| 2014/0063054 A1* | 3/2014 | Osterhout | G06F 3/005 345/633 |
| 2014/0063055 A1* | 3/2014 | Osterhout | G06F 3/005 345/633 |
| 2015/0309316 A1* | 10/2015 | Osterhout | G06F 3/012 345/8 |
| 2017/0344114 A1* | 11/2017 | Osterhout | G06F 3/012 |

* cited by examiner

TRANSFLECTIVE COATINGS FOR TRANSPARENCIES

CROSS-REFERENCE TO RELATED APPLICATION

This application claims the benefit of and priority to U.S. Provisional Patent Application No. 62/463,900, filed on Feb. 27, 2017, entitled TRANSFLECTIVE COATINGS FOR TRANSPARENCIES, the entire disclosure of which is hereby incorporated herein by reference.

FIELD OF THE DISCLOSURE

The present disclosure generally relates to transflective coatings, and more particularly, to transflective coatings for transparencies and electrodes.

BACKGROUND OF THE DISCLOSURE

In many transparency applications, and in particular for electrode applications, it may be advantageous to minimize heat gain within an enclosure incorporating the transparency. However, simple metal coatings, which may reduce heat transmittance, may result in low transmittance and an undesirable interior and exterior reflectance and glare. Accordingly, new coatings which both reduce heat transmission, as well as have a low reflectance, and which can function as electrodes in electro-optic devices, may be desirable.

SUMMARY OF THE DISCLOSURE

According to at least one aspect of the present disclosure, an electro-optic element includes a first substantially transparent substrate defining a first surface and a second surface. A second substantially transparent substrate defines a third surface and a fourth surface. A primary seal is disposed between the first and second substrates. The seal and the first and second substrates define a cavity. An electro-optic material is positioned within the cavity. A transflective coating having a transmittance of between about 15% and about 60% in a visible wavelength band is positioned on at least one of the second and third surfaces. The transflective coating includes a first layer including an absorbing material, a second layer, a third layer including a low index metal and a fourth layer. The second and fourth layers include at least one of a dielectric material and a transparent conducting oxide. The first layer is closer to the first surface than the fourth layer.

According to another aspect of the present disclosure, a transparency includes a substrate defining a first surface and a second surface. A transflective coating having a transmittance of between about 15% and about 60% in a visible wavelength band is positioned on at least one of the first and second surfaces. The transflective coating includes a first layer including an absorbing material, a second layer, a third layer including a low index metal and a fourth layer. The second and fourth layers include at least one of a dielectric material and a transparent conducting oxide. The transflective coating has a greater reflectance of visible light as measured from the second surface than the first surface.

These and other features, advantages, and objects of the present disclosure will be further understood and appreciated by those skilled in the art by reference to the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION OF EMBODIMENTS

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

Referring to FIGS. 1-5, reference numeral 10 generally designates a transparency. The transparency 10 may include a coated single substrate, an insulated glass unit, and/or an electro-optic element. The transparency 10 includes a first substrate 14 defining a first surface 14A and a second surface 14B. A transflective coating 18 may have a transmittance of between about 15% and about 60% in a visible wavelength band. The transflective coating 18 includes a first layer 22, a second layer 26, a third layer 30 and a fourth layer 34. The first layer 22 includes an absorbing material. The third layer 30 includes a low index metal. The second and fourth layers 26, 34 may include at least one of a dielectric material and a transparent conducting oxide. The transflective coating 18 may have a greater reflectance of visible light as measured from the second surface 14B than the first surface 14A. According to various examples, the transflective coating 18 may function as an electrode.

Figure 1:
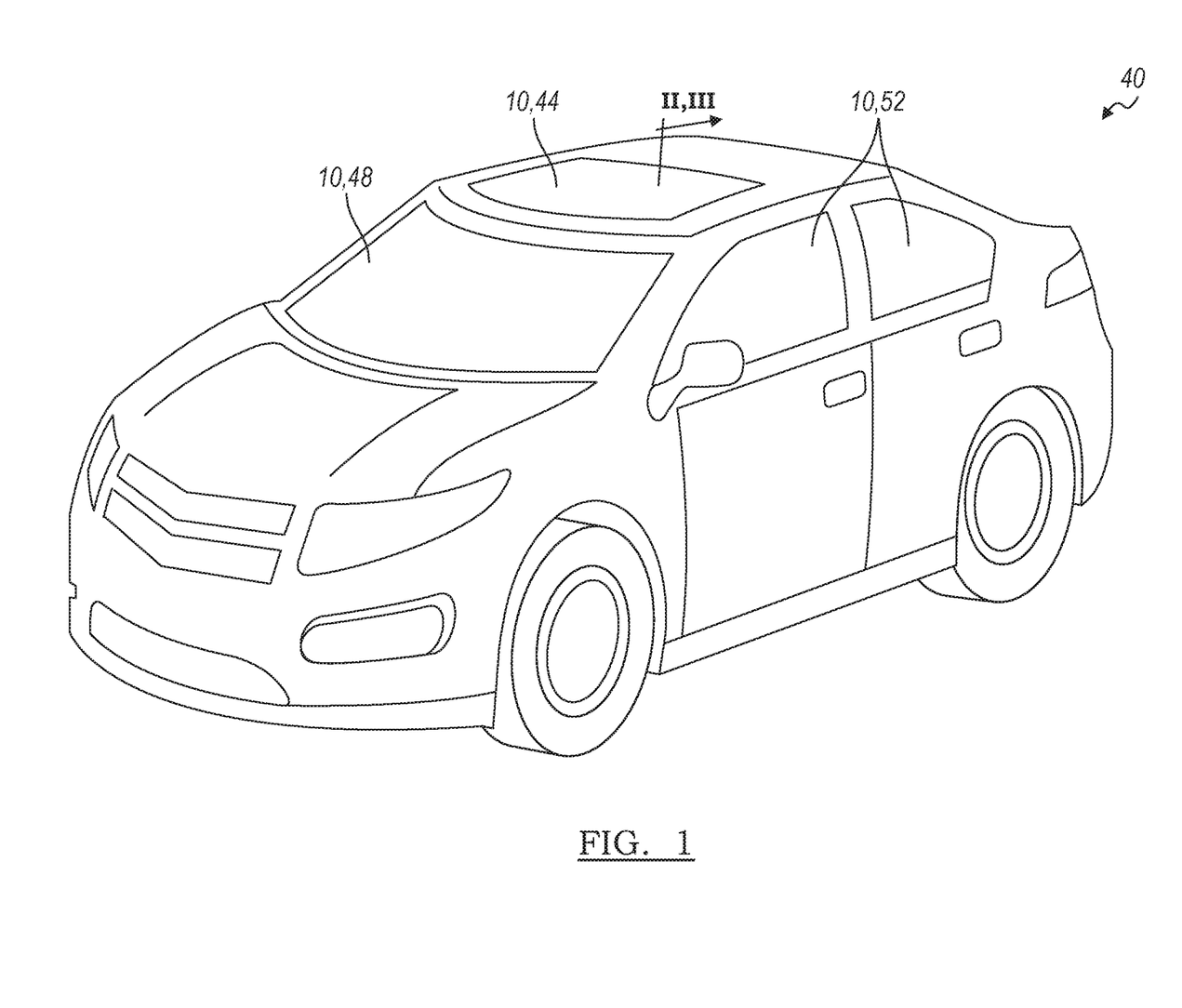
FIG. 1 is a top perspective view of a vehicle, according to at least one example.

Referring now to FIG. 1, although the transparency 10 is depicted in a vehicle 40, the transparency 10 may equally be utilized in building, aerospace (e.g., planes) and non-automotive (e.g., train) applications. The transparency 10 may be utilized to allow visible light to enter and exit an enclosure (e.g., an interior of the vehicle 40 and/or the interior of a building) while minimizing the entrance of near-infrared (NIR) and/or infrared radiation. In the depicted example of the vehicle 40, the transparency may be utilized as a moon roof 44, a windshield 48, side windows 52 and/or other transparencies 10 located around the vehicle 40.

Figure 2:
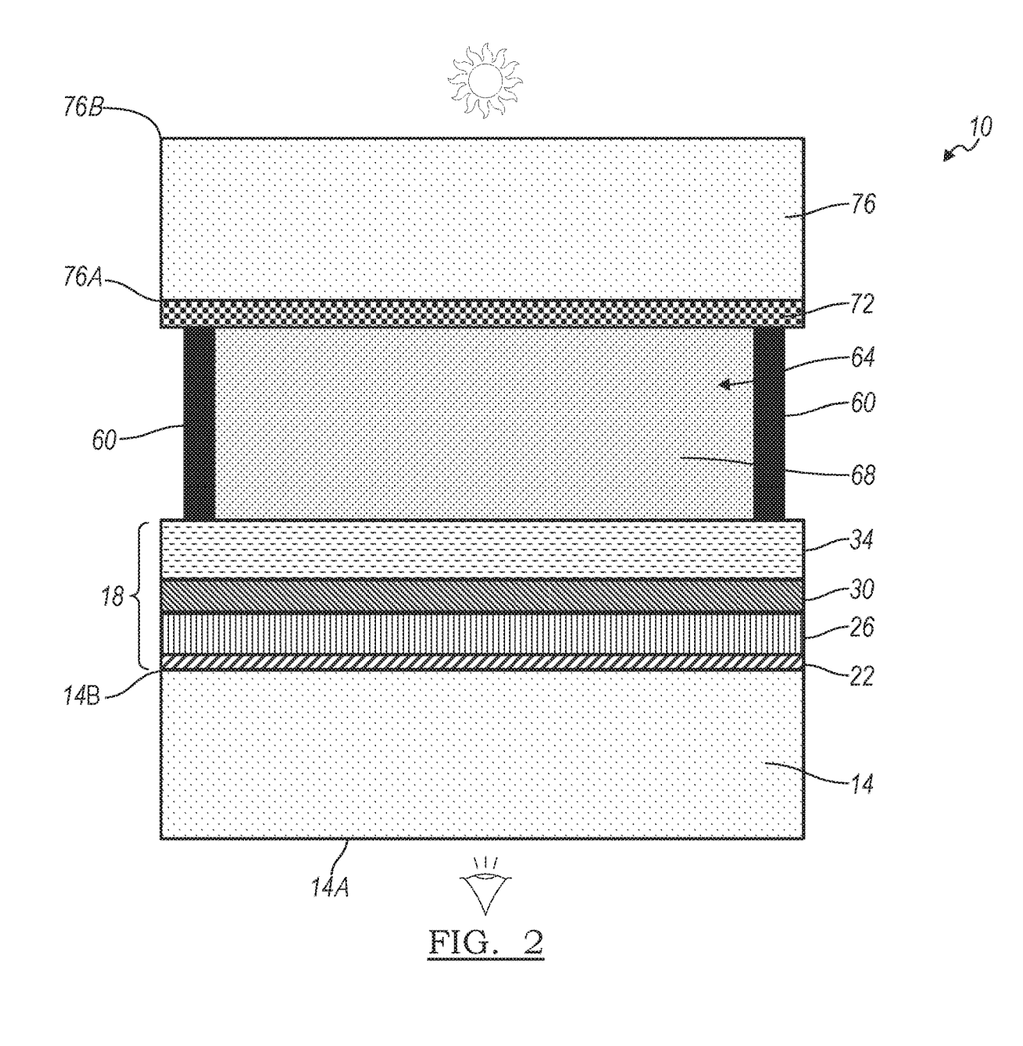
FIG. 2 is a cross-sectional view taken at line II of FIG. 1, according to at least one example.
Figure 3:
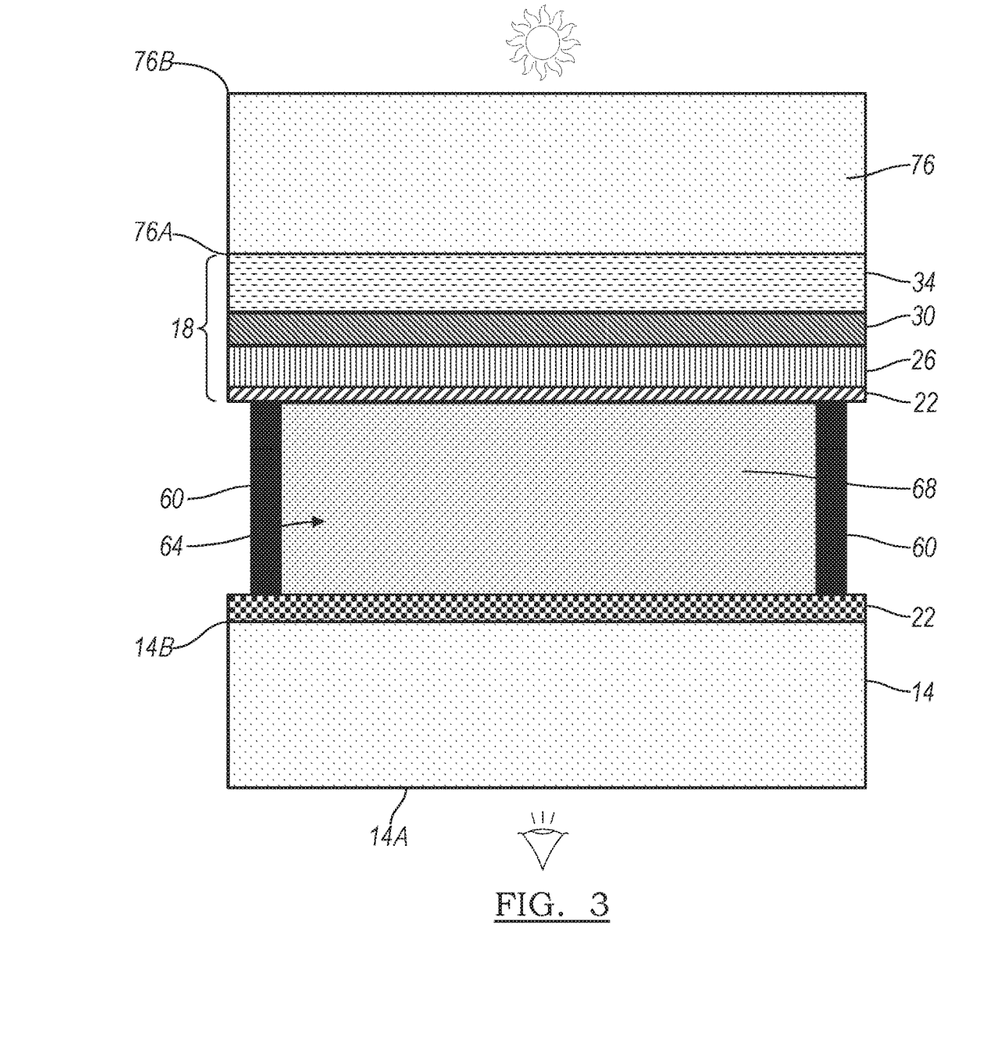
FIG. 3 is a cross-sectional view taken at line III of FIG. 1, according to at least one example.

Referring now to FIGS. 2 and 3, the transparency 10 is depicted as an electro-optic element. In such an example, the transparency 10 may include the first substrate 14, the transflective coating 18, a primary seal 60, a cavity 64, an electro-optic material 68, an electrode 72 and a second substrate 76 defining a third surface 76A and a fourth surface 76B. According to various examples, the first surface 14A may be a side facing an interior of the vehicle 40 (FIG. 1) or other structure (e.g., a building) the transparency 10 is used in. In other words, the first surface 14A may be the viewing surface. The fourth surface 76B may be known as an exterior surface, or a sunlit surface.

The first substrate 14 may include a variety of materials transparent in the visible region of the electromagnetic spectrum including soda-lime float glass, EAGLE® glass, alkaline earth boro-aluminosilicate glass, GORILLA® glass, alkali-aluminosilicate glass, chemically strengthened glass, insulated glass, tempered glass, sapphire, optical crystals, diamond, quartz, ceramics, polymers, plastics and/or combinations thereof. The second substrate 76 may include the same, or different, materials as the first substrate 14. The first and second substrates 14, 76 may have a thickness between about 0.1 mm to about 10 mm, or between about 0.5 mm and about 5.0 mm, or between about 0.6 mm to about 3.0 mm. In some examples, the thicknesses of the first and second substrates 14, 76 may differ from one another. The first and second substrates 14, 76 may take a variety of shapes including square, rectangular, circular, oblong, and combinations thereof. According to various examples, the first and/or second substrates 14, 76 may have a curvature across the length or width (i.e., a vertical or horizontal axis, or in an X- and Y-direction in a horizontal plane) of the transparency 10.

The first and second substrates 14, 76 can be positioned in a parallel relationship and sealed around the perimeter using the primary seal 60 to define the cavity 64. It will be understood that the transflective coating 18 and/or electrode 72 may be positioned between the seal 60 and the first and second substrates 14, 76 or may be positioned entirely within the seal 60 such that the seal 60 is in contact with the second and third surfaces 14B, 76A without departing from the teachings provided herein. The seal 60 extends around the second and third surfaces 14B, 76A to confine the electro-optic material 68 between the first and second substrates 14, 76. Additional information related to forming a seal between a first and second substrate can be found in U.S. Pat. No. 5,790,298, entitled "METHOD OF FORMING OPTICALLY TRANSPARENT SEAL AND SEAL FORMED BY SAID METHOD," which is hereby incorporated herein by reference in its entirety. The cavity 64 may have a spacing between the first and second substrates 14, 76 of less than or equal to about 1000 μm, 750 μm, 500 μm, 250 μm, 100 μm, 90 μm, 75 μm, 50 μm, 40 μm, 35 μm, or less than or equal to about 20 μm.

The illustrated electro-optic element example of the transparency 10 has the electro-optic material 68 positioned between the first substrate 14 and the second substrate 76 in the cavity 64. According to one example, the electro-optic element may be a liquid crystal device, including a liquid crystal medium (e.g., the electro-optic material 68), configured to attenuate light transmitted through the electro-optic element and/or transparency 10. In another example, the electro-optic element may be a suspended particle device. In some examples, the electro-optic material 68 may be an electrochromic material. In such examples, the electro-optic material 68 may be a solution phase as disclosed in U.S. Pat. No. 4,902,108 entitled "SINGLE-COMPARTMENT, SELF-ERASING, SOLUTION-PHASE ELECTROCHROMIC DEVICES, SOLUTIONS FOR USE THEREIN, AND USES THEREOF" and U.S. Pat. No. 5,278,693 entitled "TINTED SOLUTION-PHASE ELECTROCHROMIC MIRRORS," commonly assigned to Gentex Corporation, both of which are hereby incorporated in their entirety herein. In other examples, the electro-optic material 68 may be in a solid-state. In such a configuration, the electro-optic element discussed herein may be configured to be transitioned between substantially transparent and substantially darkened states. For example, the electro-optic material 68 may be configured to variably adjust the transmittance of visible light through the transparency 10 from between about 0.1% to about 60%, or between about 20% to about 50%. In specific examples, the electro-optic material 68 may be configured to variably adjust the transmittance of visible light through the transparency 10 from a maximum transmittance state to less than or equal to about 15%, about 10%, about 5%, about 2.5% or less than or equal to about 1%.

The electrode 72 may be positioned on the second surface 14B (FIG. 2) and/or on the third surface 76A (FIG. 3). The electrode 72 may include a transparent conductor such as a transparent conducting oxide (TCO) (e.g., indium-tin-oxide, $F:SnO_2$, doped-ZnO, IZO), carbon (graphene and/or graphite) and/or a conductive metal mesh (e.g., nanowires). Additionally or alternatively, the electrode 72 may include an IMI type structure where M includes a low index metal (e.g., silver and/or a silver alloy) and where I includes an insulator, dielectric and/or transparent conducting oxide. In cases where a TCO (e.g., indium-tin-oxide) is used, the electrode 72 may have a sheet resistance of between about 1 ohm/sq and about 100 ohms/sq. For example, the sheet resistance of the electrode 72 may be less than or equal to about 10 ohms/sq, about 6 ohms/sq or less than or equal to about 3 ohms/sq. Further, the transflective coating 18 may have sheet resistances less than or equal to about 10 ohms/sq, about 6 ohms/sq or less than or equal to about 3 ohms/sq. In the depicted examples, the electrode 72 is located on the opposite side of the cavity 64 from the transflective coating 18. It will be understood that the electrode 72 may be positioned on the same side of the cavity 64 as the transflective coating 18 and/or that the transflective coating 18 functions as an electrode without departing from the teachings provided herein. Further, the transparency 10 may include multiple electrodes 72 (e.g., positioned on the second and third surfaces 14B, 76A) without departing from the teachings provided herein.

As explained above, the transflective coating 18 includes the first layer 22, the second layer 26, the third layer 30 and the fourth layer 34. The transflective coating 18 may be positioned on the second and/or third surfaces 14B, 76A in examples of the transparency 10 including the first and the second substrates 14, 76. According to various examples, the order of the layers 22, 26, 30, 34 may remain substantially the same relative to a viewer within the enclosure whether the transflective coating 18 is positioned on the first or second substrate 14, 76 or any surface thereof. For example, a viewer of the transflective coating 18, when viewed from the interior, will view the first, second, third and fourth layers 22, 26, 30, 34 in that order regardless of whether the transflective coating 18 is on the second or third surfaces 14B, 76A. Further, light passing through the transparency 10, from the exterior to the interior, will pass through the fourth, third, second and first layers 34, 30, 26 and 22 in that order. By arranging the order of the layers 22, 26, 30, 34 based on the direction of the light, various beneficial optical properties may be achieved as explained in greater detail below. It will be understood that the first layer 22 is closer to the first surface 14A than the fourth layer 34.

The first layer 22 may be composed of an absorbing material. The absorbing material may be a metal, a metal oxide, a metal nitride and/or combinations thereof. Exemplary metals which may be utilized in the first layer 22 may include chromium, molybdenum, nickel, inconel, indium, palladium, osmium, tungsten, rhenium, iridium, rhodium, ruthenium, stainless steel, tantalum, titanium, copper, nickel, gold, platinum, any other platinum group metals, zirconium, vanadium, AlSi alloys, alloys thereof and combinations thereof. The absorbing material of the of the first layer 22 may have a refractive index of between about 1.0 and about 6.0, or between about 2.0 and about 5.0, or between about 2.2 and about 4.8. An imaginary refractive index for the absorbing material may be less than or equal to about 3 times or less than or equal to about 2 times the real portion of the refractive index. A thickness of the first layer 22 may be between about 0.5 nm and 10 nm, or between about 1 nm and 6 nm. In examples where the first layer 22 is in contact with the electro-optic material 68, the first layer 22 may be electrically conductive.

The second and fourth layers 26, 34 may be composed of a dielectric material and/or transparent conducting oxide. The second and fourth layers 26, 34 may be further subdivided into sub-layers with the same or different refractive indices as one another. The dielectric material and/or transparent conducting oxide may be ITO, $SnO_2$, SiN, $MgF_2$, $SiO_2$, $TiO_2$, $F:SnO_2$, $NbO_X$, $TaO_X$, indium zinc oxide, aluminum zinc oxide, zinc oxide, electrically conductive $TiO_2$, $CeO_X$, ZnS, chromium oxide, $ZrO_X$, $WO_3$, nickel oxide, $IrO_2$, $NiO_X$, $CrO_X$, $NbO_X$, and/or $ZrO_X$, or other material with a refractive index between about 1.37 and about 4.0. The thickness of the second and fourth layers 26, 34 may vary over a wide range of thicknesses in order to simultaneously tune the reflected and transmitted properties. The second layer 26 may have a thickness of between about 20 nm to about 100 nm. The fourth layer 34 may have a thickness of between about 40 nm to greater than about 500 nm. According to various examples, where the fourth layer 34 is positioned proximate the electro-optic material 68 (e.g., as in FIG. 2), the fourth layer 34 may be electrically conductive.

According to various examples, the third layer 30 may be composed of a low refractive index metal. A low refractive index metal may be a metal with an index of refraction of less than or equal to about 2.0. Exemplary low refractive index materials may include silver, a silver alloy, copper, gold, zinc, other low refractive index metals and/or combinations thereof. The low refractive index material may be doped. Exemplary dopants may include gold, palladium, platinum, rhodium, titanium, aluminum, zinc, copper, tin, silicon, germanium, manganese, magnesium, tungsten, lead, boron, chromium, thorium, tantalum, lithium, indium other dopants and/or combinations thereof. These dopants may be used to alter the optical properties of the host low refractive index material (e.g., silver), improve durability in environmental testing or improve the electrochemical stability of the low refractive index material. The third layer 30 may have a real refractive index of less than or equal to about 2.0, 1.5, 1.0 or less than or equal to about 0.5. According to various examples, an imaginary portion of the refractive index of the third layer 30 may be greater than the real portion. For example, the imaginary portion of the refractive index may be about 2.5 times, 5.0 times, 7.5 times, or 10 times the real portion of the refractive index. The third layer 30 may have a thickness of between about 5 nm to about 25 nm, or between about 9 nm to about 20 nm.

Use of the presently disclosed transflective coating 18 and transparency 10 may offer a variety of advantages. First, the transflective coating 18 may be configured to largely reflect non-visible wavelengths of ambient lighting (e.g., total solar irradiance). For example, a majority of solar irradiance has energy outside the visible spectrum in the form of infrared and near-infrared (NIR) radiation (e.g., wavelengths of light greater than about 800 nm). The transflective coating 18 may be configured to have a NIR reflectance which is greater than or equal to about 1.25 times, 1.5 times or greater than or equal to about 2 times the reflectance in the visible spectrum. The reflection of the non-visible wavelengths of the solar spectra by the transflective coating 18 may reduce solar loading on the enclosure behind the transparency 10. Such an example may be advantageous in increasing occupant comfort within an enclosure incorporating the transparency 10.

Second, the transflective coating 18, may offer a variety of beneficial optical properties. For example, a delta C* (as measured proximate the first and/or fourth surfaces 14A, 76B) may be less than or equal to about 15, 10, 6 or less or equal to about 4 for reflected interior or exterior viewing angle shift of less than or equal to about 60°, 45°, 40°, 30°, 20°, 10°, or less than or equal to about 6° where 0° is normal to the viewing surface (e.g., the first or fourth surfaces 14A, 76B). In a specific example, the transflective coating 18 has a delta C* of less than or equal to about 6 with angle shift up to about 45 degrees. Further, the transflective coating 18 may have a C* value for at least one of transmittance, interior reflectance (e.g., reflectance measured from the first surface 14A) and exterior reflectance (e.g., with reflectance measured from the fourth surface 76B) of less than or equal to about 15, 10 or less than or equal to about 5. The transflective coating 18 may provide an interior absorption (e.g., with reflectance as measured proximate the first surface 14A) which is greater than or equal to about 1.25 times, 1.5 times, or greater than or equal to about 2 times an exterior absorption (e.g., as measured proximate the fourth surface 76B). Further, an exterior visible-band reflectance (e.g., as measured proximate the fourth surface 76B) may be between about 15% and about 50% or between about 20% and about 40% while an interior visible-band reflectance (e.g., as measured proximate the first surface 14A) is less than or equal to about 20%, 15% or less than or equal to about 10%. The transflective coating 18 may have a visible wavelength transmittance of between about 15% and about 60%. Even further, the color of the interior and/or exterior visible reflectance may be tuned to match a color scheme of an interior or exterior of the enclosure (e.g., the vehicle 40 and/or a building).

EXAMPLES

Table 1 details a series of theoretical stacks (e.g., the transflective coating 18) with varying materials in layer positions 1, 2, 3 and 4 (e.g., the first, second, third and fourth layers 22, 26, 30, 34), layer thicknesses and resultant reflectance and transmittance properties on a window (e.g., the transparency 10). The layers in the stack are shown on the left side of the table with the layer located toward the interior (e.g., closest to the first substrate 14) in the leftmost position. The stack is then built up in sequence going from left to right with the rightmost layer nearest the exterior (e.g., the second substrate 76). The thickness of the layers (in nm) are shown below the respective example. When a layer material is designated by two element symbols, a numeral and X, it will be understood that the second element has a weight percentage within the first element of the numeral percent.

TABLE 1

| Example | Surface | Viewing Side | | | | | | Exterior Side |
|---|---|---|---|---|---|---|---|---|
| 1 | 2 | Cr | ITO | Ag/Au_7X | ITO | | | |
| | | 2.3 | 50.2 | 9.6 | 296.4 | | | |
| 2a | 2 | Ru | ITO | Ag/Au_7X | ITO | TiO$_2$ | | |
| | | 1.3 | 44.7 | 16.3 | 162.1 | 138.0 | | |
| 2b | 3 | Ru | ITO | Ag/Au_7X | ITO | TiO$_2$ | | |
| | | 1.3 | 44.7 | 16.3 | 162.1 | 138.0 | | |
| 3 | 3 | Ru | ITO | Ag/Au_7X | ITO | TiO$_2$ | | |
| | | 1.6 | 53.2 | 10.3 | 247.6 | 108.2 | | |
| 4 | 3 | Ru | ITO | Ag/Au_7X | ITO | TiO$_2$ | | |
| | | 0.6 | 46.3 | 15.4 | 273.3 | 102.6 | | |
| 5 | 3 | Tantalum | ITO | Ag/Au_7X | ITO | TiO$_2$ | | |
| | | 5.1 | 28.5 | 16.9 | 99.8 | 93.1 | | |
| 6 | 3 | MoRe-1 | ITO | Ag/Au_7X | ITO | TiO$_2$ | | |
| | | 0.7 | 40.5 | 10.8 | 25.7 | 49.2 | | |
| 7 | 3 | Al—Ti 50-50 | ITO | Ag/Au_7X | ITO | TiO$_2$ | | |
| | | 2.3 | 40.9 | 11.2 | 30.1 | 41.2 | | |
| 8 | 3 | Al—Ti 50-50 | ITO | Ag/Au_7X | ITO | TiO$_2$ | | |
| | | 3.5 | 41.4 | 10.2 | 38.9 | 31.8 | | |
| 9 | 3 | W | ITO | Ag/Au_7X | ITO | TiO$_2$ | | |
| | | 6.2 | 23.4 | 18.2 | 102.6 | 92.5 | | |
| 10 | 3 | Cr 15% Air | ITO | Ag/Au_7X | ITO | TiO$_2$ | | |
| | | 1.5 | 43.5 | 16.3 | 123.2 | 215.5 | | |
| 11 | | Platinum | ITO | Ag/Au_7X | ITO | SiO$_2$ | TiO$_2$ | |
| | | 3.4 | 46.1 | 15.9 | 141.8 | 2.8 | 155.0 | |
| 12 | 2 | W | ITO | Ag/Au_7X | ITO | SiO$_2$ | TiO$_2$ | |
| | | 1.9 | 34.2 | 13.5 | 156.4 | 15.7 | 135.8 | |
| 13 | 2 | W | ITO | Zn | ITO | SiO$_2$ | TiO$_2$ | |
| | | 0.8 | 47.1 | 10.1 | 134.2 | 75.1 | 118.0 | |
| 14 | 2 | Cr | ITO | Al—Si 90-10 | Ru | TiO$_2$ | ITO | TiO$_2$ |
| | | 0.7 | 56.68 | 9.19 | 0.03 | 227.29 | 4.82 | 275.22 |
| 15 | 2 | Cr | ITO | Ru | Ag/Au_7X | Ru | ITO | TiO$_2$ |
| | | 1.7 | 44.9 | 0.5 | 15.5 | 0.1 | 159.3 | 143.4 |
| 16 | 2 | Platinum | ITO | Ag/Au_7X | ITO | SiO$_2$ | TiO$_2$ | |
| | | 3.0 | 45.5 | 15.3 | 136.4 | 1.3 | 316.6 | |
| 17 | 2 | Cr | ITO | Ru | Ag/Au_7X | Ru | TiO$_2$ | ITO | TiO$_2$ |
| | | 2.94 | 42.12 | 0.27 | 19.97 | 0.02 | 153.92 | 51.16 | 108.74 |
| 18 | 2 | Cr | ITO | Ru | Ag/Au_7X | Ru | TiO$_2$ | ITO | TiO$_2$ |
| | | 2.25 | 42.63 | 0.07 | 15.62 | 0.11 | 163.72 | 42.88 | 108.77 |
| 19 | 2 | Cr | ITO | Ag/Au_7X | TiO$_2$ | ITO | TiO$_2$ | | |
| | | 2.7 | 38.7 | 14.4 | 157.8 | 74.5 | 104.9 | | |
| 20 | 2 | Cr | ITO | Ag/Au_7X | TiO$_2$ | ITO | TiO$_2$ | | |
| | | 3.1 | 34.2 | 13.4 | 148.6 | 100.0 | 98.1 | | |
| 21 | 2 | Cr | ITO | Ru | Ag/Au_7X | Ru | TiO$_2$ | ITO | TiO$_2$ |
| | | 2.4 | 40.3 | 0.1 | 14.7 | 0.1 | 160.3 | 70.0 | 106.0 |

Referring now to Tables 2-4, the interior reflectance as viewed from the interior direction (e.g., proximate the first surface 14A) and the exterior direction (e.g., proximate the fourth surface 76B), the transmittance, absorption ratio (e.g., interior direction divided by exterior direction) is provided for an electrochromic element (e.g., examples where the electro-optic material 68 is electrochromic). For each of the reflectances and the transmittances, the CIE Y value and L*a*b* values are shown. The absorption is shown for the interior directed reflectance which is calculated by subtracting the reflectance and transmittance from 100%. The sheet resistance is estimated based on the thickness of a low index material layer (e.g., the third layer 30) and the thicknesses of a transparent conducting oxide containing layers (e.g., the second and fourth layers 26, 34). The bulk resistivity is 300 micro-ohm cm for the TCO and 6 micro-ohm cm for the low index material. The actual sheet resistance may vary depending on the actual bulk resistivity of the materials used and the how they are deposited.

TABLE 2

| | Interior Reflectance | | | | | |
|---|---|---|---|---|---|---|
| Example | Y | L* | a* | b* | C* | Absorption |
| 1 | 6.1 | 29.6 | 11.9 | −15.6 | 19.6 | 68.3 |
| 2a | 13.3 | 43.2 | 0.1 | −3.0 | 3.0 | 45.4 |
| 2b | 12.5 | 42.0 | 2.8 | −7.6 | 8.1 | 44.2 |
| 3 | 6.4 | 30.4 | 7.8 | −17.7 | 19.3 | 68.2 |
| 4 | 17.9 | 49.4 | 3.7 | −4.8 | 6.1 | 46.6 |
| 5 | 11.0 | 39.6 | 1.5 | 1.4 | 2.1 | 40.6 |
| 6 | 16.6 | 47.7 | 8.3 | −0.6 | 8.3 | 38.0 |
| 7 | 16.7 | 47.8 | 7.3 | −0.7 | 7.4 | 38.3 |
| 8 | 10.6 | 39.0 | 11.2 | −3.4 | 11.7 | 46.5 |
| 9 | 10.5 | 38.7 | 4.4 | 1.0 | 4.5 | 40.7 |
| 10 | 10.2 | 38.1 | 9.0 | −6.9 | 11.3 | 48.7 |
| 11 | 12.2 | 41.5 | 1.4 | 0.9 | 1.7 | 48.5 |
| 12 | 14.2 | 44.6 | 2.5 | −0.3 | 2.5 | 49.2 |
| 13 | 17.7 | 49.1 | −1.6 | −1.3 | 2.0 | 47.6 |
| 14 | 17.8 | 49.3 | 2.6 | −2.9 | 3.9 | 55.7 |
| 15 | 13.2 | 43.0 | −2.4 | −1.4 | 2.8 | 47.9 |
| 16 | 13.2 | 43.1 | 6.0 | 1.0 | 6.1 | 46.9 |
| 17 | 12.3 | 41.6 | 3.0 | 2.1 | 3.6 | 38.9 |
| 18 | 12.9 | 42.5 | 2.4 | 0.4 | 2.4 | 47.7 |
| 19 | 13.4 | 43.3 | 2.0 | 3.5 | 4.0 | 47.6 |
| 20 | 14.9 | 45.5 | 0.7 | 5.7 | 5.7 | 47.7 |
| 21 | 13.5 | 43.5 | 3.3 | 2.2 | 3.9 | 56.8 |

TABLE 3

Exterior Reflectance

| Example | Y | L* | a* | b* | C* | Absorption |
|---|---|---|---|---|---|---|
| 1 | 39.1 | 68.8 | −8.8 | −10.3 | 13.5 | 35.2 |
| 2a | 29.3 | 61.0 | −3.1 | −2.4 | 3.9 | 29.4 |
| 2b | 29.4 | 61.1 | −3.0 | −2.7 | 4.0 | 27.4 |
| 3 | 39.1 | 68.9 | −6.0 | −7.2 | 9.4 | 35.5 |
| 4 | 39.6 | 69.2 | −4.1 | −4.8 | 6.4 | 25.0 |
| 5 | 18.6 | 50.2 | −1.9 | −0.6 | 2.0 | 33.0 |
| 6 | 35.6 | 66.2 | −0.3 | 1.2 | 1.3 | 18.9 |
| 7 | 35.3 | 66.0 | −0.9 | 0.5 | 1.0 | 19.7 |
| 8 | 32.4 | 63.7 | −0.8 | 0.2 | 0.8 | 24.7 |
| 9 | 19.0 | 50.7 | −1.4 | 2.8 | 3.1 | 32.1 |
| 10 | 30.9 | 62.4 | −1.2 | −3.3 | 3.5 | 28.0 |
| 11 | 30.3 | 61.9 | −2.0 | −2.0 | 2.8 | 30.4 |
| 12 | 37.6 | 67.7 | 1.2 | 2.7 | 2.9 | 25.9 |
| 13 | 30.3 | 61.9 | −8.5 | −8.1 | 11.7 | 34.9 |
| 14 | 32.5 | 63.8 | −3.4 | −7.4 | 8.1 | 41.0 |
| 15 | 29.1 | 60.8 | 0.7 | −2.2 | 2.3 | 32.1 |
| 16 | 31.3 | 62.8 | −1.1 | −1.9 | 2.2 | 28.8 |
| 17 | 20.1 | 52.0 | −1.3 | −0.6 | 1.4 | 31.1 |
| 18 | 29.6 | 61.3 | 3.9 | −2.0 | 4.4 | 30.9 |
| 19 | 30.1 | 61.8 | 1.8 | 2.1 | 2.8 | 30.9 |
| 20 | 29.8 | 61.5 | 0.7 | 0.7 | 0.9 | 32.8 |
| 21 | 38.2 | 68.2 | −7.3 | −7.3 | 10.3 | 32.1 |

TABLE 4

| | Transmittance | | | | | Sheet Resistance | Absorption |
|---|---|---|---|---|---|---|---|
| Example | Y | L* | a* | b* | C* | Ohm/Sq. | Ratio |
| 1 | 25.7 | 57.7 | 13.5 | 17.9 | 22.4 | 3.6 | 1.9 |
| 2a | 41.4 | 70.4 | −1.8 | −2.0 | 2.7 | 2.9 | 1.5 |
| 2b | 43.3 | 71.8 | −1.3 | −0.4 | 1.4 | 2.9 | 1.6 |
| 3 | 25.4 | 57.5 | 3.0 | 10.0 | 10.4 | 3.7 | 1.9 |
| 4 | 35.5 | 66.1 | −2.6 | 3.1 | 4.0 | 2.8 | 1.9 |
| 5 | 48.5 | 75.1 | −1.2 | 1.0 | 1.6 | 3.1 | 1.2 |
| 6 | 45.5 | 73.2 | −3.1 | 0.7 | 3.2 | 5.0 | 2.0 |
| 7 | 45.0 | 72.9 | −2.7 | 0.2 | 2.7 | 4.8 | 1.9 |
| 8 | 42.9 | 71.5 | −3.0 | 0.7 | 3.1 | 5.1 | 1.9 |
| 9 | 48.9 | 75.4 | −1.9 | −1.4 | 2.4 | 2.9 | 1.3 |
| 10 | 41.1 | 70.3 | −4.4 | 2.5 | 5.0 | 3.1 | 1.7 |
| 11 | 39.3 | 69.0 | −2.7 | −2.1 | 3.4 | 3.6 | 1.6 |
| 12 | 36.6 | 66.9 | −7.2 | −3.3 | 8.0 | 3.5 | 1.9 |
| 13 | 34.8 | 65.6 | −5.5 | −5.1 | 7.5 | | 1.4 |
| 14 | 26.5 | 58.5 | −0.9 | 0.0 | 0.9 | | 1.4 |
| 15 | 38.9 | 68.7 | −5.0 | −4.4 | 6.7 | 3.1 | 1.5 |
| 16 | 39.9 | 69.4 | −5.5 | −1.3 | 5.7 | 3.7 | 1.6 |
| 17 | 48.8 | 75.3 | −3.4 | −3.5 | 4.8 | 2.7 | 1.3 |
| 18 | 39.5 | 69.1 | −10.8 | −2.3 | 11.0 | 3.5 | 1.5 |
| 19 | 39.0 | 68.8 | −7.3 | −7.0 | 10.1 | 3.6 | 1.5 |
| 20 | 37.4 | 67.6 | −5.6 | −5.8 | 8.0 | 3.7 | 1.5 |
| 21 | 29.7 | 61.4 | 1.5 | 1.8 | 2.4 | 3.6 | 1.8 |

In Tables 1-4, examples 3 to 11 represent cases where the material used for layer 1 is varied. The other layers in these stacks are varied to achieve different reflectance and transmittance targets. Example 12 represents an example where layer 4 is further subdivided and SiO$_2$ is added. Examples 13 and 14 represent cases where the layer 3 low index metal is Zn and an Aluminum/Silicon alloy with 90% aluminum. The refractive index of the Zn layer is 1.01 and 4.31 for the real and imaginary components, respectively. The refractive index of the AlSi layer is 1.24 and 4.94 for the real and imaginary components, respectively. Example 15 demonstrates the addition of thin metal layers (e.g., Ru) adjacent to the low index layer 3 which in this example is an AgAu7x alloy. The thin metal layers can be used to help stabilize adhesion in the stack and protect the low index layer. Examples 16 to 18 represent examples of color stability with viewing angle from the exterior (e.g., fourth surface 76B) reflected direction. The color stability is quantified by equation 1:

$$\text{delta } C^* = \sqrt{((a^*i - a^*a) \cdot 2 + (b^*i - b^*a) \cdot 2)} \tag{1}$$

where a*i is at normal incident, a*a is at angle, b*i is at normal incident, b*a is at angle. The delta C* may be less than or equal to about 15, 10, 6 or less than or equal to about 4 for viewing angles of 30 degrees, 45 or 60 degrees and all angles therebetween. The delta C* is 5.0, 5.5 and 3.1 for examples, 16, 17 and 18, respectively at 45°. The delta C* is 8.7, 8.8 and 6.9 for examples, 16, 17 and 18, respectively at 60°. Examples 19 to 21 represent examples of optimal color stability with viewing angle and different colors from the exterior reflected direction. The delta C* is 1.7, 3.3 and 2.3 for examples, 16, 17 and 18, respectively at 45°. The delta C* is 1.7, 1.4 and 1.7 for examples, 16, 17 and 18, respectively at 60°.

Figure 4:
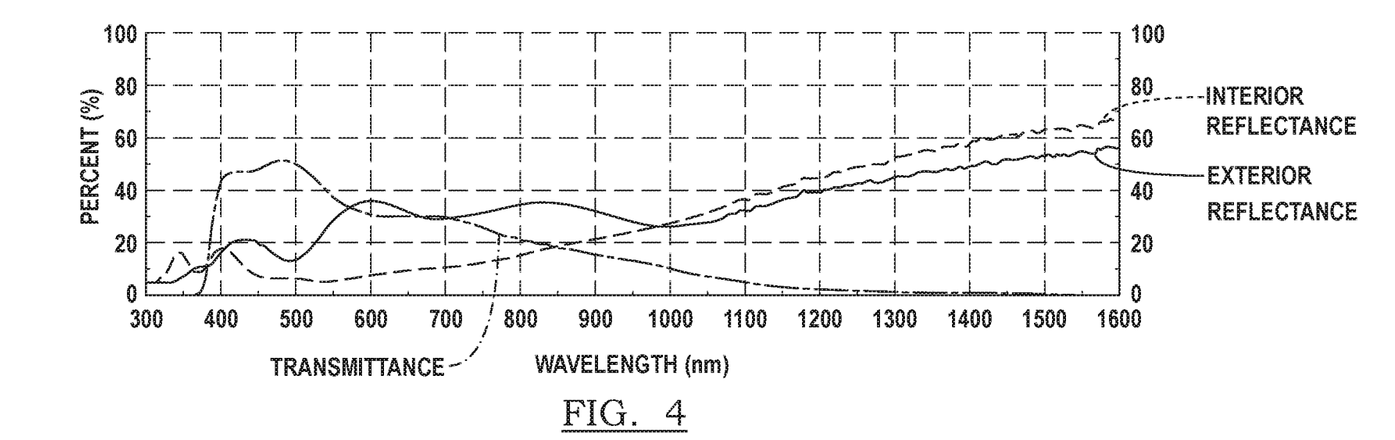
FIG. 4 is a plot depicting percent reflectance and transmittance.
Figure 5:
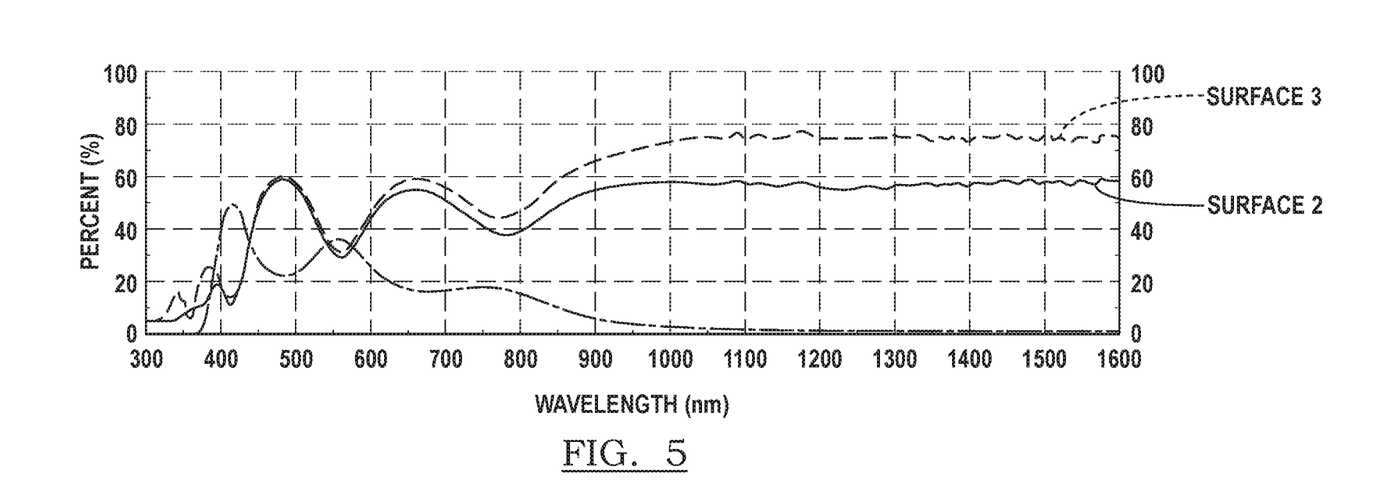
FIG. 5 is a plot depicting percent reflectance and transmittance.

Referring now to FIGS. 4 and 5, the performance metrics of the stack (e.g., the transflective coating 18) were examined using thin film models. These examples are for an electrochromic device (e.g., an example where the electro-optic material 68 of the transparency 10 is electrochromic).

Referring now to FIG. 4, a 4-layer stack example including, in order from an interior to an exterior (e.g., the second surface 14B to the third surface 76), includes Cr/ITO/AgAu7x/ITO and is positioned on an interior of the window (e.g., the second surface 14B of the first substrate 14). The AgAu7x is a silver-gold alloy with 7% gold content by weight. The refractive index is 0.14 and 3.71 for the real and imaginary components, respectively. The interior reflectance is about 6%, exterior (e.g., visible light) reflectance is about 39% and the transmittance is about 26% at a wavelength of about 550 nm (e.g., visible light).

Referring now to FIG. 5, depicted is the transmittance and reflectance spectra for examples 2a and 2b of Tables 1-4 positioned on surface 2 (e.g., the second surface 14B) and surface 3 (e.g., the third surface 76A). As can be seen, the NIR reflectance is appreciably higher for the surface 3 orientation. The surface 2 orientation has the exterior light passing through the glass (e.g., the second substrate 76), ITO (e.g., the electrode 72) and electrochromic media (e.g., the electro-optic material 68) twice. The added absorption by the inclusion of the ITO and electrochromic media leads to the lower NIR reflectance with the surface 2 orientation (i.e., the electrochromic media is given two chances to absorb the NIR). Accordingly, in applications, the positioning of the transflective coating 18 on the third surface 76A may be advantageous in reducing the amount of NIR and infrared radiation absorbed by the electro-optic material 68 (e.g., and less heat may leak into the enclosure).

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and, further, it is to be understood that such concepts are intended to be covered by the following claims, unless these claims, by their language, expressly state otherwise. Further, the claims, as set forth below, are incorporated into and constitute part of this Detailed Description.

What is claimed is:

1. An electro-optic element, comprising:
a first substantially transparent substrate defining a first surface and a second surface$_L$ wherein the first surface faces an interior;
a second substantially transparent substrate defining a third surface and a fourth surface, wherein the fourth surface faces an exterior;
a primary seal disposed between the first and second substrates, the seal and the first and second substrates defining a cavity therebetween;
an electro-optic material positioned within the cavity;
a transflective coating having a transmittance of between about 15% and about 60% in a visible wavelength band positioned on at least one of the second and third surfaces, comprising:
a first layer comprising an absorbing material;
a second layer;
a third layer comprising a low index metal; and
a fourth layer, wherein the second and fourth layers comprise at least one of a dielectric material and a transparent conducting oxide, wherein the first layer is closer to the first surface than the fourth layer; and
wherein an interior visible-band reflectance as measured proximate the first surface is less than or equal to about 20%.

2. The electro-optic element of claim 1, wherein the transflective coating has a greater reflectance of visible light as measured from the fourth surface than the first surface.

3. The electro-optic element of claim 1, wherein the transflective coating has a reflectance in the near-infrared spectrum of greater than about 50%.

4. The electro-optic element of claim 3, wherein the transflective coating has a reflectance in the near-infrared spectrum of greater than about 70%.

5. The electro-optic element of claim 1, wherein a reflection of a visible band of light as measured proximate the fourth surface is between about 15% and about 50%.

6. The electro-optic element of claim 5, wherein a reflection of a visible band of light as measured proximate the fourth surface is between about 20% and about 40%.

7. The electro-optic element of claim 1, wherein an absorption of at least one of a visible, near-infrared and total solar band of light as measured from the first surface is greater than an absorption of the band of light as measured proximate the fourth surface by greater than or equal to about 1.25 times.

8. The electro-optic element of claim 1, wherein a color value is less than about 15 C* for at least one of transmittance, reflectance measured from the first surface and reflectance measured proximate the fourth surface.

9. The electro-optic element of claim 8, wherein a color value is less than about 5 C* for at least one of transmittance, reflectance measured from the first surface and reflectance measured proximate the fourth surface.

10. The electro-optic element of claim 1, wherein the electro-optic material is an electrochromic material and wherein at least one of the first and fourth layers is electrically conductive.

11. The electro-optic element of claim 1, wherein the first layer has a thickness of between about 0.5 nm and about 10 nm.

12. The electro-optic element of claim 1, wherein the second layer has a thickness of between about 40 nm and about 500 nm.

13. The electro-optic element of claim 1, wherein a sheet resistance of the transflective coating is less than or equal to about 10 ohms/sq.

14. The electro-optic element of claim 13, wherein a sheet resistance of the transflective coating is less than or equal to about 6 ohms/sq.

15. The electro-optic element of claim 14, wherein a sheet resistance of the transflective coating is less than or equal to about 3 ohms/sq.

16. A transparency, comprising:
a substrate defining a first surface and a second surface, wherein the first surface faces an interior; and
a transflective coating having a transmittance of between about 15% and about 60% positioned on at least one of the first and second surfaces, comprising:
  a first layer comprising an absorbing material;
  a second layer;
  a third layer comprising a low index metal; and
  a fourth layer, wherein the second and fourth layers comprise at least one of a dielectric material and a transparent conducting oxide,
  further wherein the transflective coating has a greater reflectance of visible light as measured from the second surface than the first surface and an interior visible-band reflectance as measured proximate the first surface is less than or equal to about 20%.

17. The transparency of claim 16, wherein the transflective coating has a reflectance in the near-infrared spectrum of greater than about 25%.

18. The transparency of claim 16, wherein the transflective coating has a reflectance in the near-infrared spectrum of greater than about 70%.

19. The transparency of claim 16, wherein the transflective coating has a delta C* of less than or equal to about 15 with angle shift of less than about 60 degrees.

20. The transparency of claim 19, wherein the transflective coating has a delta C* of less than or equal to about 6 with angle shift up to about 45 degrees.

* * * * *